(12) United States Patent
Marzorati et al.

(10) Patent No.: US 11,146,558 B2
(45) Date of Patent: Oct. 12, 2021

(54) STATELESS MULTI-PARTY AUTHORIZATION SYSTEM IN WEB APPLICATIONS

(71) Applicant: INTERNATIONAL BUSINESS MACHINES CORPORATION, Armonk, NY (US)

(72) Inventors: Mauro Marzorati, Lutz, FL (US); Seda Özses, Vienna (AT); Juraj Nyíri, Ivanka pri Nitre (SK); Shikhar Kwatra, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/815,043

(22) Filed: Mar. 11, 2020

(65) Prior Publication Data

US 2021/0288959 A1    Sep. 16, 2021

(51) Int. Cl.
*H04L 29/06* (2006.01)
*H04L 9/32* (2006.01)

(52) U.S. Cl.
CPC ........ *H04L 63/0884* (2013.01); *H04L 9/3226* (2013.01); *H04L 9/3236* (2013.01); *H04L 63/0869* (2013.01)

(58) Field of Classification Search
CPC .............. H04L 63/0884; H04L 9/3226; H04L 63/0869; H04L 9/3236
See application file for complete search history.

(56) References Cited

U.S. PATENT DOCUMENTS 6,011,848 A    1/2000    Kanda
6,282,295 B1   8/2001    Young
(Continued)

FOREIGN PATENT DOCUMENTS

CN      1249972 C      4/2006
WO      0182190 A1    11/2001

OTHER PUBLICATIONS

Canahuati, "Keeping Passwords Secure", Facebook newsroom, Mar. 21, 2019, https://newsroom.fb.com/news/2019/03/keeping-passwords-secure/, pp. 1-5.

(Continued)

*Primary Examiner* — Huan V Doan
(74) *Attorney, Agent, or Firm* — Alexis N. Hatzis

(57) ABSTRACT

A method, a computer system, and a computer program product for authorization using multiple entities is provided. Embodiments of the present invention may include generating a secret, a user hash and an application hash. Embodiments of the present invention may include transmitting the user hash, the application hash and the password to an identity verification authority. Embodiments of the present invention may include generating a password hash. Embodiments of the present invention may include transmitting the user hash and the application hash to a server. Embodiments of the present invention may include identifying the password hash that is associated with the user hash and the application hash, transmitting the password hash and an authorization notification to the identity verification authority, comparing the password hash with a previously stored password hash and determining that the comparison of the password hash with the previously stored password hash matches.

20 Claims, 9 Drawing Sheets

(56) References Cited

U.S. PATENT DOCUMENTS

| | | | |
|---|---|---|---|
| 6,369,904 | B1 | 4/2002 | Bhattacharjya |
| 6,834,112 | B1 | 12/2004 | Brickell |
| 7,886,345 | B2 | 2/2011 | Kaliski |
| 8,166,301 | B2 | 4/2012 | Cam-Winget |
| 8,214,635 | B2 | 7/2012 | Wang |
| 8,316,237 | B1 | 11/2012 | Felsher |
| 9,118,645 | B2 | 8/2015 | Manning |
| 9,246,686 | B1 * | 1/2016 | Holland .................. H04L 63/12 |
| 9,853,965 | B2 | 12/2017 | Yin |
| 10,103,875 | B1 | 10/2018 | Roth |
| 2002/0071566 | A1 | 6/2002 | Kurn |
| 2013/0111570 | A1 * | 5/2013 | Kaariainen ........... H04L 63/126 |
| | | | 726/5 |

OTHER PUBLICATIONS

Fielding et al., "14 Header Field Definitions", Accessed on Jul. 31, 2019, part of hypertext Transfer Protocol—HTTP/1.1, https://www.w3.org/Protocols/rfc2616/rfc2616-sec14.html, pp. 1-45.

Fielding et al., "Hypertext Transfer Protocol—HTTP/1.1", Jun. 1999, https://tools.ietf.org/html/rfc2616, 176 pages.

Fielding et al., "Hypertext Transfer Protocol (HTTP/1.1): Authentication", Jun. 2014, https://tools.ietf.org/html/rfc7235, pp. 1-38.

Franks et al., "HTTP Authentication: Basic and Digest Access Authentication", https://tools.ietf.org/html/rfc2617, Jun. 1999, pp. 1-42.

Franks, et al., "HTTP Authentication: Basic and Digest Access Authentication", Jun. 1999, https://www.ietf.org/rfc/rfc2617.txt, pp. 1-42.

https://developer.mozilla.org/en-US, "Resources for developers, by developers.", Accessed on Sep. 23, 2019, 4 pages.

https://openid.net/what-is-openid/, "What is OpenID?", OpenID, Accessed on Jul. 31, 2019, pp. 1-3.

https://stackoverflow.com/questions/3467114/how-are-cookies-passed-in-the-http-protocol, "How are cookies passed in the HTTP protocol?", Accessed on Jul. 31, 2019, 1 page.

https://www.grc.com/sqrl/sqrl.htm, "Secure Quick Reliable Login", GRC's | SQRL Secure Quick Reliable Login, Last Updated: Jun. 8, 2019, 2 pages.

https://www.httpwatch.com/httpgallery/authentication/, "HTTP Gallery", 10. HTTP Authentication, Accessed on Jan. 31, 2019, 4 pages.

https://www.tutorialspoint.com/http/http_responses.htm, "HTTP—Responses", Accessed on Sep. 23, 2019, 4 pages.

Nielsen et al., "An HTTP Extension Framework", Feb. 2000, https://tools.ietf.org/html/rfc2774, pp. 1-40.

Team Stormpath, "To Put or Post?", Apr. 25, 2013, https://stormpath.com/blog/put-or-post, 7 pages.

Wikipedia, "One-time password", https://en.wikipedia.org/wiki/One-time_password, Accessed on Jul. 31, 2019, 8 pages.

Wikipedia, "Security Assertion Markup Language", Accessed on Jul. 31, 2019, https://en.wikipedia.org/wiki/Security_Assertion_Markup_Language, pp. 1-13.

Mell et al., "The NIST Definition of Cloud Computing", Recommendations of the National Institute of Standards and Technology, Special Publication 800-145, Sep. 2011, 7 pages.

* cited by examiner

STATELESS MULTI-PARTY AUTHORIZATION SYSTEM IN WEB APPLICATIONS

BACKGROUND

The present invention relates generally to the field of computing, and more particularly to data privacy. Data security and trust issues may occur in a cloud computing environment when user data or consumer data is continuously provided to various online consumer platforms and social network platforms. Users may not be confident that the data provided is being handled properly. Additionally, security breaches and the mishandling of data continues to occur. Even data provided in regulated industries may, in retrospect, be discovered to have been accessed without proper authorization.

SUMMARY

Embodiments of the present invention disclose a method, a computer system, and a computer program product for authorization using multiple entities. Embodiments of the present invention may include generating, by a proxy, a secret, a user hash and an application hash based on receiving client data, wherein the client data includes a username, a password and application data. Embodiments of the present invention may include transmitting, by the proxy, the user hash, the application hash and the password to an identity verification authority. Embodiments of the present invention may include generating, by the identity verification authority, a password hash. Embodiments of the present invention may include transmitting, by the identity verification authority, the user hash and the application hash to a server. Embodiments of the present invention may include identifying, by the server, the password hash that is associated with the user hash and the application hash. Embodiments of the present invention may include transmitting the password hash and an authorization notification to the identity verification authority. Embodiments of the present invention may include comparing, by the identity verification authority, the password hash with a previously stored password hash. Embodiments of the present invention may include determining that the comparison of the password hash with the previously stored password hash matches.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
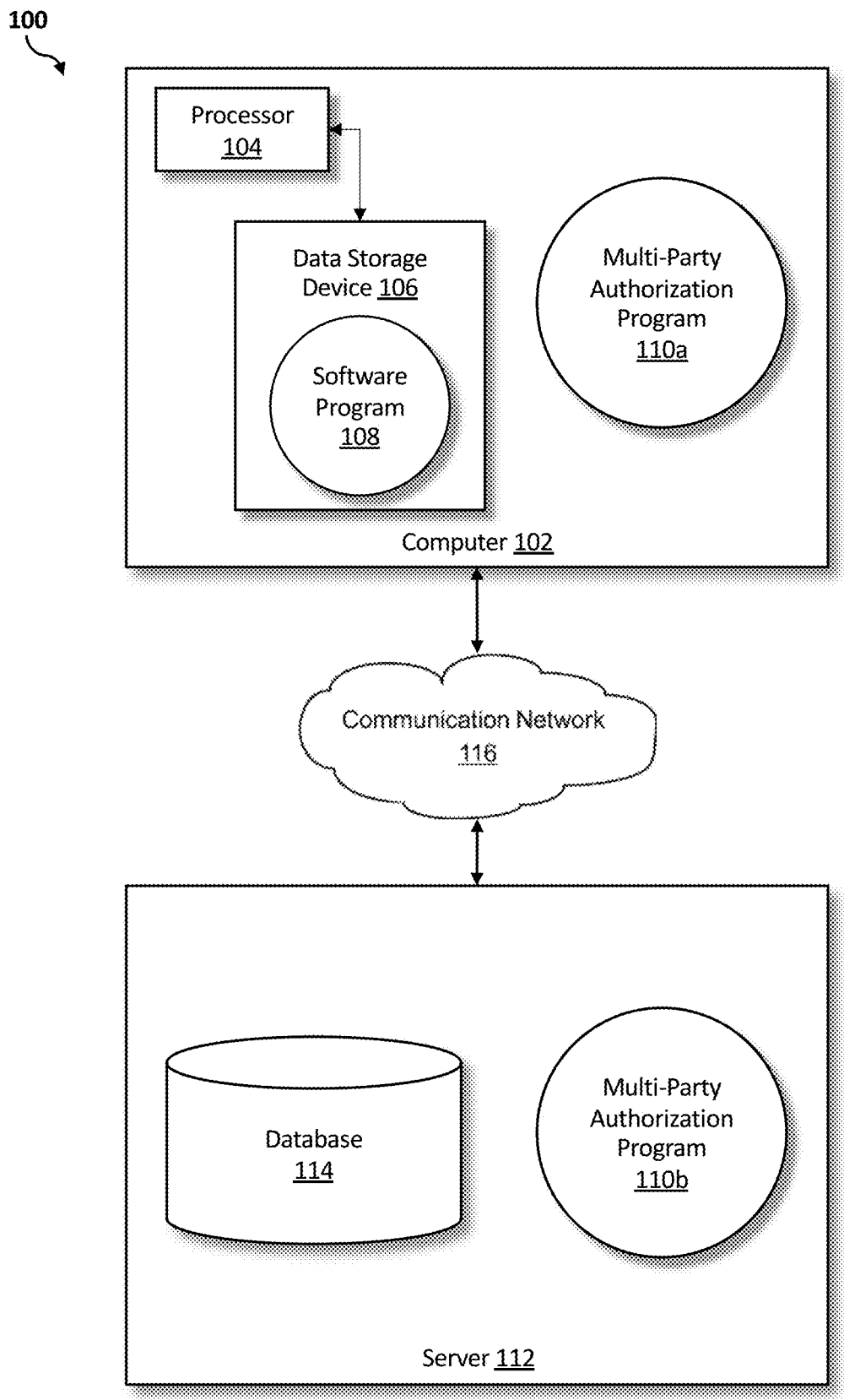
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, data security and trust issues may occur in a cloud computing environment when user data or consumer data is continuously provided to various online consumer platforms and social network platforms. Users may not be confident that the data provided is being handled properly. Additionally, security breaches and the mishandling of data continues to occur. Even data provided in regulated industries may, in retrospect, be discovered to have been accessed without proper authorization. Therefore, it may be advantageous to, among other things, create a system that authorizes access to data before the data is made available by using a stateless multi-party system by implementing a separation of duties between entities and leveraging security protocols during the authentication process.

The following described exemplary embodiments provide a system, method and program product for data security. As such, embodiments of the present invention have the capacity to improve the field of data security by creating and implementing a stateless multi-party authorization system. More specifically, the stateless multi-party authorization system may be created and implemented by applying a dynamic separation of duties between entities, thus, not allowing one single entity to be in possession of all of the tokens needed to access the protected information in a cloud environment.

Beneficial features of the stateless multi-party authorization system may include increasing the entropy of the system or decreasing the predictability of the system. Entropy may also be referred to as complexity or unpredictability. As the entropy of the system rises, the complexity of the system rises, and the predictability of the system reduces. An increasingly complex system may include each entity implementing different entity generation algorithms. Sources of complexity in the system may include the generation of salts in each of the several hashes that may be employed into the system. Each hash may or may not be salted and if the hash is salted, then each hash may have a different algorithm. Therefore, the complexity of the system may include individualized cryptographic salts.

The user salts may be used for creating one or more secrets by hashing passwords as opposed to using common salt values. For example, a user identification (ID) may include a username created by the user to log into a network or an application. A salt may be a form of cryptography that adds random data to user data, such as a user password, to safeguard the stored data. A salt may also be randomly generated at a registration process and remain the same salt unless regenerated for changes in user data (e.g., user ID or password). Salts may also protect users in cases where the user has the same password for many different accounts and when the user has regular words (i.e., words that may be found in a dictionary) in their password. Salted passwords strengthen internet security from attacks.

Additionally, beneficial features of the stateless multi-party authorization system may include zero-knowledge proof (ZKP) tokens that can be used and can support per-user salts. Zero-knowledge proof tokens may prove knowledge without revealing the information required for the proof. For example, multiple types of information may each have different hash values, such as a password, a username and an application. Zero-knowledge proof tokens may be required for collaborative authentication in web applications and one party or entity may not have access to all of the keys or encryption and decryption keys.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a multi-party authorization program 110a. The networked computer environment 100 may also include a server 112 that is enabled to run a multi-party authorization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the multi-party authorization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the multi-party authorization program 110a, 110b (respectively) to secure client data when the client is interacting with applications in a cloud environment. The stateless multi-party authorization method is explained in more detail below with respect to FIGS. 2-5.

Figure 2:
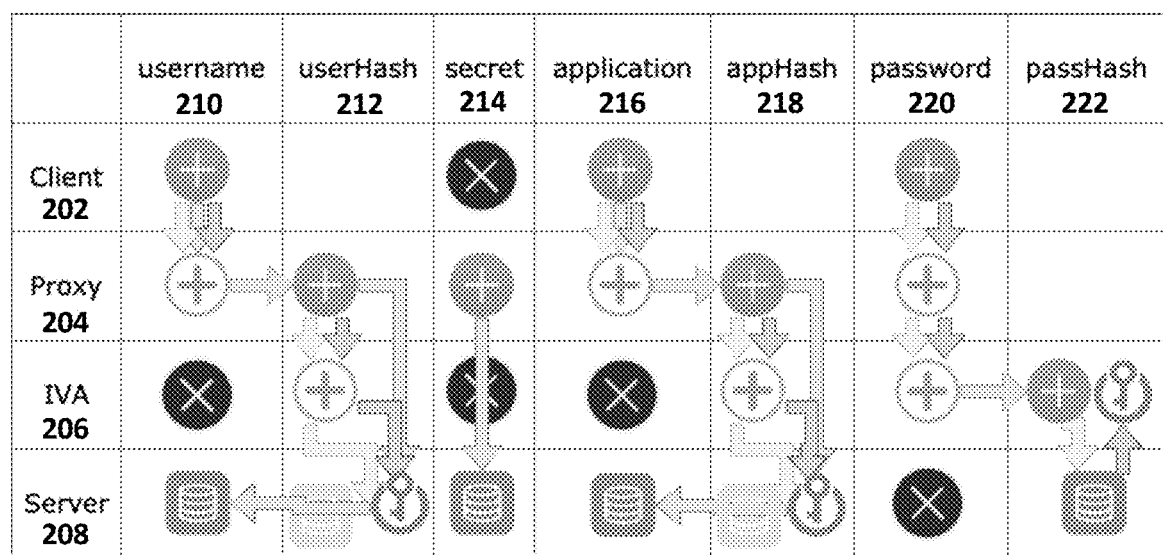
FIG. 2 is a block diagram of the entity and object capabilities according to at least one embodiment.

Referring now to FIG. 2, a block diagram illustrating the entity and object capabilities 200 used by the multi-party authorization program 110a, 110b according to at least one embodiment is depicted. The multi-party authorization program 110a, 110b is a stateless system that utilizes various entities to implement the entity generation algorithms distinctly. Stateful applications may store data and stateless applications may not require the storage of data. Each entity may generate and implement distinct algorithms differently, therefore, the system increases in entropy or complexity and increases the level of security for the information being transmitted. Increased complexity may be a result of, for example, the distinct algorithms such as algorithms that contain odd numbers, even numbers, prime numbers or multiples of a number with two decimal places (e.g., 57.25). The practicability of the using the multi-party authorization program 110a, 110b may be equivalent to known methods, such as hypertext transfer protocol (HTTP) authentication methods, such as HTTP Basic Authentication (RFC2617), HTTP Digest (RFC7616) or HTTP new technology LAN manager (NTLM) (RFC4559). However, the multi-party authorization program 110a, 110b offers a system that is higher in complexity and in security than these listed methods.

The entity and object capabilities 200 block diagram presents an example of how data is transmitted between the client 202 and the various entities to secure client data by allowing each entity some functions but not all functions during the process to generate a new secret, to generate a new account and to authenticate the client 202 for an application accessibility in a cloud environment. Additionally, each entity may only have access to some of the data transmitted (i.e., may not have access to all of the data) relating to generating a secret, generating an new account or authenticating the client 202.

Entities may include, for example, a client 202 or user, a proxy 204 (i.e., a proxy server or a reverse proxy), an identity verification authority (IVA 206), a server 208 (i.e., a forward proxy) and computing devices that use HTTP or a hypertext transfer protocol secure (HTTPS) protocol. One distinction between the proxy and the server may include that a proxy 204 transmits data communication with a web server and the server transmits data communication with a client 202 or a web browser. Additionally, a proxy 204 may be considered a distinct actor as related to the separation of duties. For example, the proxy 204 program or function may physically reside in the same machine or processor that is acting as a client 202 or a server 204. However, the proxy 204 may only have access to some, not all, of the information, distinct algorithms, hashes, keys or tokens that may be transmitted through the same physical computing device.

The HTTP authentication specification, such as syntax as authorization: <type> <credentials> may be extended with a new scheme called identity verification scheme (IVS). The IVS may hold tag=value tuples modeled after a domainkeys identified mail (DKIM) protocol. For example, syntax may include an authorization: IVS <tag=value> and a sample request may include:

POST/account/HTTP/1.1;
Host: www.hostname.com;
Autorization: IVS; and
Action=givePassHash.

The HTTP request headers may be extended with a new tag=value tuples modeled after the DKIM protocol, such as:

UserHash=<userHash>;
PassHash=<passHash>;
AppHash=<appHash>;
Secret=<secret>;
Authentication=<true|false>;

and a sample request may include:

POST/account/HTTP/1.1;
Host: www.hostname.com;
ApplicationHash=Am6zaY3WKeNs
POST/account/HTTP/1.1;
Host: www.hostname.com; and
Authentication=true.

The HTTP response headers may be extended with a new tag=value tuples modeled after the DKIM protocol, such as:

UserHash=<userHash>;
PassHash=<passHash>;
AppHash=<appHash>;

and a sample response may include:

POST/account/HTTP/1.1 200 OK; and
PasswordHash=PNTY5st6yYmE.

According to an embodiment, each entity implementing different algorithms may include the proxy 204 that may store and invoke an algorithm to generate a secret. The proxy 204 may also store and invoke a different algorithm to generate a user hash (userHash 212) and an application hash (appHash 218) using a username received from a client 202 and the secret generated from the proxy 204. Additionally, the server 208 may store and implement an algorithm that generates an appHash 218. The IVA 206 may store and invoke an algorithm to generate a passcode or a password hash (passHash 222) using the client password and no other entity may have access to or have decoding ability of the IVA 206 algorithm that may access the unhashed version or a clear text version of the password.

According to an embodiment, objects may be used to describe digital objects, ranging from a simple to a complex type of digital information. Objects may include, for example, a userHash 212, an appHash 218, a passHash 222 and a secret 214. Each entity and each object may contain different roles and different accessibility restrictions to data or information. Each entity may also contain different roles relating to creating content, creating secrets, creating new accounts, authentication of data, generation of data, transmission of data, hashing data, receiving data, decoding data, storing data and additional storage of data.

For example, the userHash 212 and the appHash 218 may be created by the proxy and uses an SHA256 hash algorithm to hash the username provided by a client 202 and the application information provided by the application program. Application information may be dependent on the application complexity. For example, less complex application information may include a username or a URL to match the user to the application and password. The passHash 222 may be created by the IVA 206 and uses an SHA256 hash algorithm to hash the password provided by the client 202. The secret 214 may be created by the proxy 204 before being transmitted to the IVA 206. A client 202 may leverage data to access cloud-based applications (e.g., application 216) using a username 210 and a password 220. Applications may include applications related to social media, online shopping, banking, or accessing secure websites, such as corporate, employee or government websites.

According to an embodiment, the IVA 206 may not store any data and may, for example, pass along encrypted data, encode data and compare the encoded data with the server stored data. The multi-party authorization program 110a, 110b may not require a separate application for an authentication process and may contain a secret model with many parties. The secret model may dictate the way in which secrets are held by each of the several entities or actors in the system. Each entity may not have all of the data required for authenticating an account. For example, a client 202 gaining secure access to an application 216 through an authentication process includes multiple entities in the authentication process and each entity only has access to part of the content or data that may be required for authentication. The multi-party authorization program 110a, 110b may secure a client account even when the client 202 is operating on websites that are not secure or websites that may be storing a client's password 220 in cleartext form.

Figure 3:
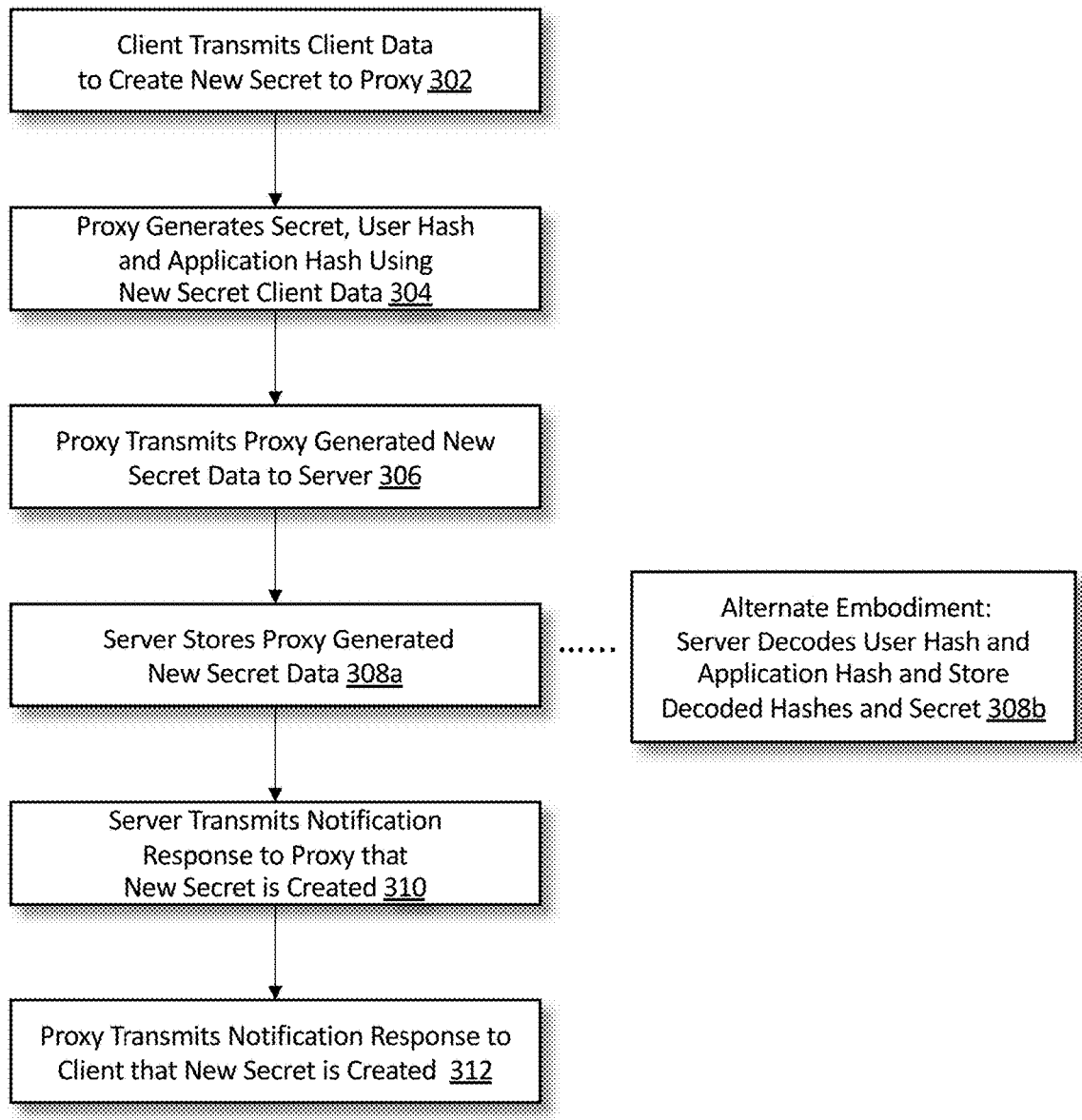
FIG. 3 is an operational flowchart illustrating a process for a stateless multi-party authorization system generating a secret according to at least one embodiment.

Referring now to FIG. 3, an operational flowchart illustrating the exemplary stateless multi-party authorization secret generation process 300 used by the multi-party authorization program 110a, 110b according to at least one embodiment is depicted. The entity and object capabilities 200 may be used to generate a secret, to create an account and to authenticate a client 202 accessing an application. An embodiment to generate a secret is now depicted.

At 302, the client 202 transmits client data to create a new secret to the proxy 204. The client 202 may send an HTTP request to the proxy 204. The HTTP request may be transmitted with client data, such as a username and the application information for an initial setup (i.e., the user registration). The client data may be used by the proxy 204 to create a new secret. The username may include, for example, a name that the client 202 chooses to setup an account with the application service. The application information supplied by the client 202 to the application service may include, for example, personal information from the client 202, such as name, email address, telephone number, residence address, work address, personal preferences, payment options, biometric data or other data that may relate the application service provided with the client 202. Biometric data may be obtained, received and processed via a computing device, for example, a smart phone or a smart watch that can obtain biometric data from the client 204 using a camera, a sensor or a microphone. Biometric data may include, for example, a retina scan, a voice recognition or a fingerprint scan.

An example of the transmitted client data is as follows:

POST/account/HTTP/1.1
Host: www.hostname.com
Username=<username>&Application=<application>.

At 304, the proxy 204 generates a secret 214, a user hash (e.g., userHash 212) and an application hash (e.g., appHash 218) using the received new secret client data from step 302. The secret 214 may include, for example, a random number, a salt file, a salt file that is encrypted, or other forms of secret generation that an entity may use. For example, the proxy 204 receives an HTTP request from the client 202 and upon receiving the request, the proxy 204 identifies and has access to the client's 202 username and application information. The new secret may be generated by the proxy 204. The proxy 204 may apply a proxy specific algorithm (e.g., MD5 or SHA256) by using the secret to generate the userHash 212 with the username and the appHash 218 with the application information. The userHash 212 may be generated by utilizing the client 202 provided username and the userHash 212 may anonymize the username or data and secure the data by using the secret. The appHash 218 may be generated by using the application information and anonymizes the application information using the secret. The proxy 204 stores the userHash 212, the appHash 218 and the secret and ensures that the username and the application information are anonymous and remain anonymous to entities that may not or should not have access to certain data.

At 306, the proxy 204 transmits the proxy generated new secret data to the server 208. The proxy 204 may transmit an HTTP request to the server 208. For example, the proxy 204 transmits the generated secret 214, the userHash 212 and the appHash 218 to the server 208 as exemplified as follows:
POST/account/HTTP/1.1
Host: www.hostname.com
UserHash=<userHash>&
Secret=<Secret>&AppHash=<appHash>.

At 308a, the server 208 stores the proxy generated new secret data. For example, the proxy generated secret data may be stored and may be compared to at a later time after the user has registered the user data with an application. The server 208 may receive an HTTP request from the proxy 204. The server 208 may store the secret 214, the userHash 212, the appHash 218 generated by the proxy 204. The server may store these values for the ability to later compare the values, for example, for authentication purposes when a client 202 is accessing an application.

The initial setup of creating the new secret is complete at this step. The initial setup may be considered complete when the secret ensures that no entity or actor may exclude the proxy in the subsequent steps. The server 208 may identify, have access to and be aware of the secret 214, the userHash 212 and the appHash 218. The server 208 may have the ability to decode the userHash 212 and the appHash 218 with the secret 214 to gain access to the username and application information, respectively. The server 208 may store the userHash 212, the appHash 218 and the secret 214.

An alternative embodiment, 308b, includes a server 208 decoding the userHash 212 and the appHash 218 and storing the decoded hashes and the secret 214. As indicated in step 308a, the initial setup of creating the new secret is complete at this step. The secret may ensure that no actor or entity may exclude the proxy in subsequent steps. The alternate embodiment allows the server to store different values than in step 308a for a later comparison of the values, for example, for authentication purposes and for optimization purposes when a client 202 is accessing an application. A deciding factor for when to use the alternate embodiment may be based on, for example, computing power and storage resources. Both embodiments, however, will require a comparison of values for authentication.

At 310, the server 208 transmits a notification response to the proxy 204 indicating that the new secret (e.g., secret 214) is created. The server 208 may reply back or provide a response to the proxy 204 via HTTP, for example, HTTP/1.1 210 Created. An alternate embodiment may include the secret failing or that the secret was not successfully created and stored. If the secret was not successfully created and stored, then subsequent steps may also fail.

At 312, the proxy 204 transmits a notification response to the client 202 indicating that the new secret (e.g., secret 214) is created. The proxy 204 may reply back or provide a response to the client 202 via HTTP, for example, HTTP/1.1 210 Created. The client 202 may then receive the HTTP response from the proxy 204. The client 202 may receive, for example, an alert on a computing device or a smart phone with a message of conformation that the secret has been successfully created. Alternatively, if the secret was not successfully created, the client 202 may receive a message of conformation that the secret was not successfully created or that there was an error in the process.

Figure 4:
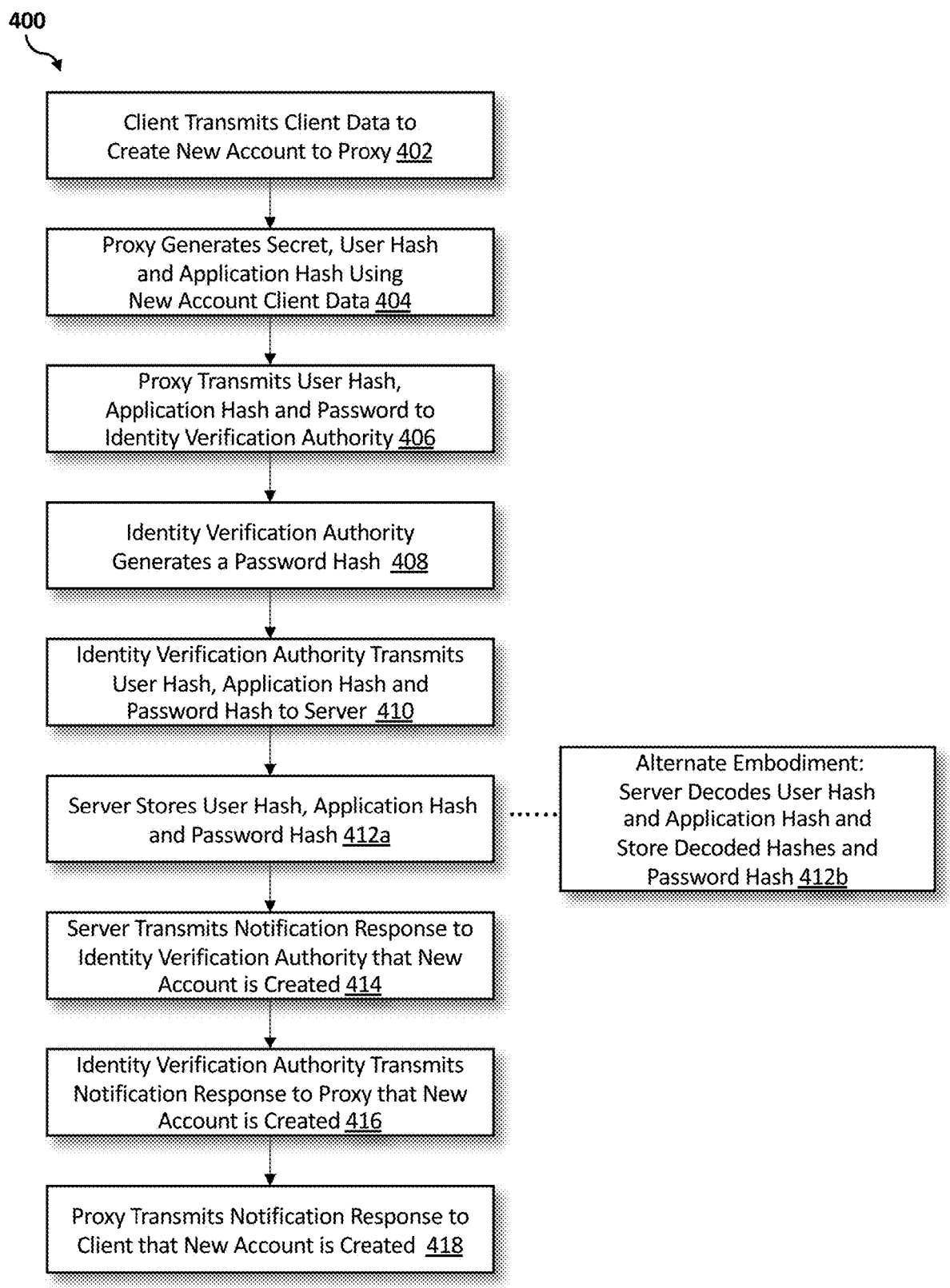
FIG. 4 is an operational flowchart illustrating a process for a stateless multi-party authorization system creating an account according to at least one embodiment.

Referring now to FIG. 4, an operational flowchart illustrating the exemplary stateless multi-party authorization account creation process 400 used by the multi-party authorization program 110a, 110b according to at least one embodiment is depicted. In FIG. 3, the secret was generated and now an embodiment to create an account is depicted. For example, an account may include a social media account, an airline account, a bank account or an account that requires authorization to access a website in a cloud computing environment.

At 402, the client 202 transmits client data to create a new account to the proxy 204. The client 202 may send an HTTP request to the proxy 204. The HTTP request may be transmitted with client data, such as a username, a password and the application information for creating a new account. The client data may be used by the proxy 204 to create a new secret. The password may be a password created by the client 202 and provided or transmitted to the proxy 204. The transmitted client data is exemplified as follows:
POST/account/HTTP/1.1
Host: www.hostname.com
Username=<username>&Password=<password>&
Application=<application>.

At 404, the proxy 204 generates a secret 214, a user hash (e.g., userHash 212) and an application hash (e.g., appHash 218) using the received new account client data. Upon receiving the HTTP request from the client 202, the proxy 204 now has access to the client username, the password and the application information. For example, the proxy 204 receives an HTTP request from the client 202 and upon receiving the request, identifies and is aware of and has access to the client's 202 username, password and application. The secret may be generated by the proxy 204. The proxy 204 may apply a proxy 204 specific algorithm by using the secret to generate the userHash 212 with the username and the appHash 218 with the application information. The userHash 212 may be generated by utilizing the client 202 provided username and the userHash 212 anonymizes the username or secure data by using the secret. The appHash 218 may be generated using the application information and anonymizes the application information using the secret. The proxy 204 stores the userHash 212, the appHash 218 and the secret and ensures that the username and the application information are anonymous and remain anonymous.

At 406, the proxy 204 transmits the user hash (e.g., userHash 212), the application hash (e.g., appHash 218) and the password 220 to the identity verification authority (e.g., IVA 206). The proxy 204 may transmit an HTTP request to the IVA 206. For example, the proxy 204 transmits the userHash 212, the appHash 218 and the password to the IVA 206 as exemplified as follows:
POST/account/HTTP/1.1
Host: www.hostname.com UserHash=<userHash>&Password=<Password>&
AppHash=<appHash>.

At 408, the identity verification authority (e.g., IVA 206) generates a password hash (e.g., passHash 222). The IVA 206 receives the HTTP request from the proxy 204. The IVA 206 has access to the userHash 212, the password and the appHash 218 based on the received request. The IVA 206 may not be privy to, know about or have access to the username, the secret or the application information. The IVA 206 may have access to the userHash 212 and the appHash 218 with no ability to decode and access the username and the application information. The IVA 206 may generate a password hash (e.g., SHA, MD5 or cryptographic) using the password data received. The hash of the password may be, for example, passHash 222.

At 410, the identity verification authority (e.g., IVA 206) transmits the user hash (e.g., userHash 212), the application hash (e.g., appHash 218) and the password hash (e.g., passHash 222) to the server 208. The IVA 206 may transmit an HTTP request to the server 208. For example, the IVA 206 transmits the userHash 212 and appHash 218 and the passHash 222 to the server 208 as exemplified as follows:

POST/account/HTTP/1.1
Host: www.hostname.com
UserHash=<userHash>&PassHash=<passHash>&
AppHash=<appHash>.

At 412a, the server 208 stores the user hash (e.g., userHash 212), the application hash (e.g., appHash 218) and the password hash (e.g., passHash 222). The server 208 may receive an HTTP request from the IVA 206. The server 208 may store the userHash 212, the appHash 218 and the passHash 222 received by the IVA 206. The server 208 may identify and have access to the userHash 212, the appHash 218 and the passHash 222. Although the server 208 may have the ability to decode the userHash 212 and the appHash 218 with the secret 214 to gain access to the username and application information, respectively, the server 208 may not have access to the password. The server 208 may also not have decoding ability to access the password, for example, in a clear text form, from the passHash 222. The server 208 may store the userHash 212, the appHash 218 and the passHash.

The server 208 may create a new account. The new account may be associated with a client application. The new account may be created by the server 208 by searching for and identifying the previously generated userHash 212 and appHash 218 pair. Identifying the previously generated userHash 212 and appHash 218 pair may include, for example, a simple string match method (i.e., no decoding). Once the correct pair are identified, the server 208 may create an account by storing the identified pair. The server 208 may not have access to algorithms or information that may decode or store, for example, a clear text form of the passHash 222.

An alternative embodiment, 412b, may include the server 208 decoding the user hash (e.g., userHash 212) and the application hash (e.g., appHash 218) and storing the decoded hashes (e.g., in clear text form) and the password hash (e.g., passHash 222). The server 208 may create a new account. The alternate embodiment allows the server 208 to store different values than in step 412a for a later comparison of the values, for example, for authentication purposes and for optimization purposes when a client 202 is accessing an application. A deciding factor for when to use the alternate embodiment may be based on, for example, computing power and storage resources. Both embodiments, however, will require a comparison of values for authentication.

At 414, the server 208 transmits a notification response to the identity verification authority (e.g., IVA 206) that the new account is created. For example, the server's 208 reply to the IVA 206 may be exemplified by the HTTP response, such as HTTP/1.1 201 Created. An alternate embodiment may include the verification failing if the values were not matched successfully. If the verification failed, then subsequent steps may also fail.

At 416, the identity verification authority (e.g., IVA 206) transmits a notification response to the proxy 204 that the new account is created. The IVA 206 may receive the server's 208 reply and transmits the new account verification to the proxy 204. For example, the IVA's 206 reply to the proxy 204 may be exemplified by the HTTP response, such as HTTP/1.1 201 Created.

At 418, the proxy 204 transmits a notification response to the client 202 that the new account is created. The proxy 204 may receive the IVA's 206 reply and transmit the new account verification to the client 202. For example, the proxy's 204 reply to the client 202 may be exemplified by the HTTP response, such as HTTP/1.1 201 Created. An alternate embodiment may include a failure response to the client 202 and the client 202 may receive the HTTP response from the proxy 204 that is dependent on how the proxy 204 failed. For example, the proxy responds with an HTTP/1.1 500, 502 or 503. The proxy 204 may possibly even not provide a response if a verification failure occurs.

Figure 5A:
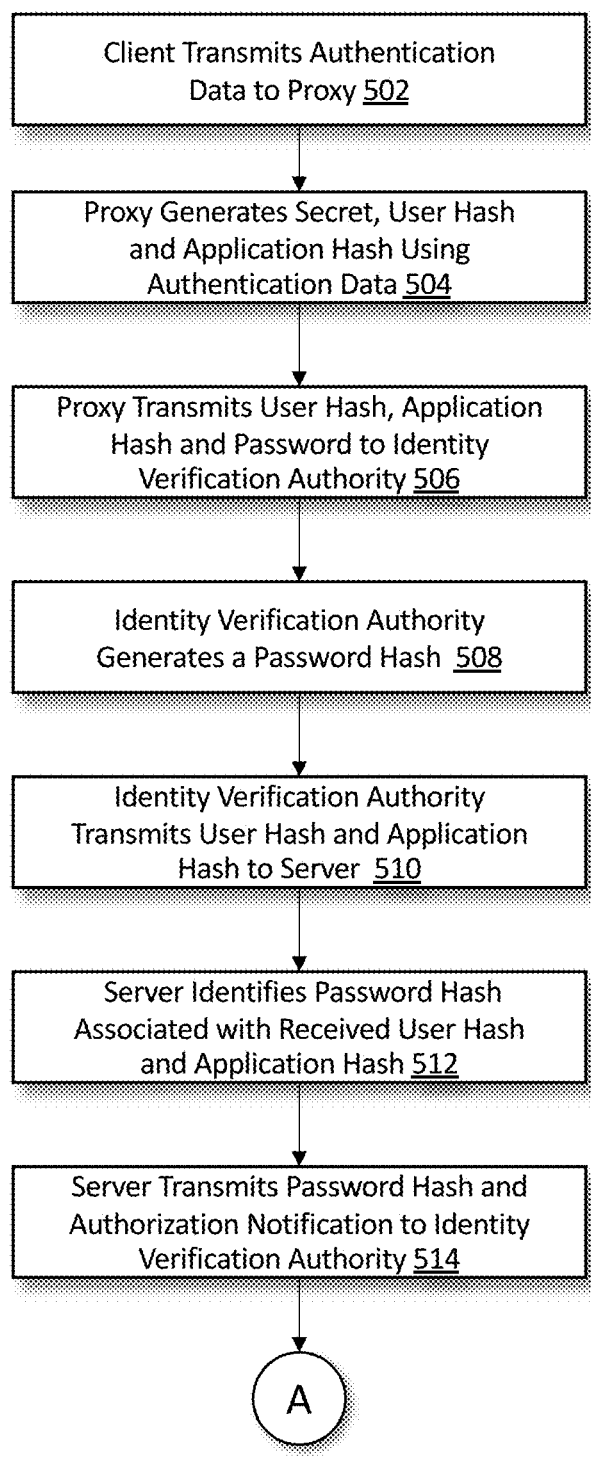
FIGS. 5A and 5B are an operational flowchart illustrating a process for a stateless multi-party authorization system authentication component according to at least one embodiment.
Figure 5B:
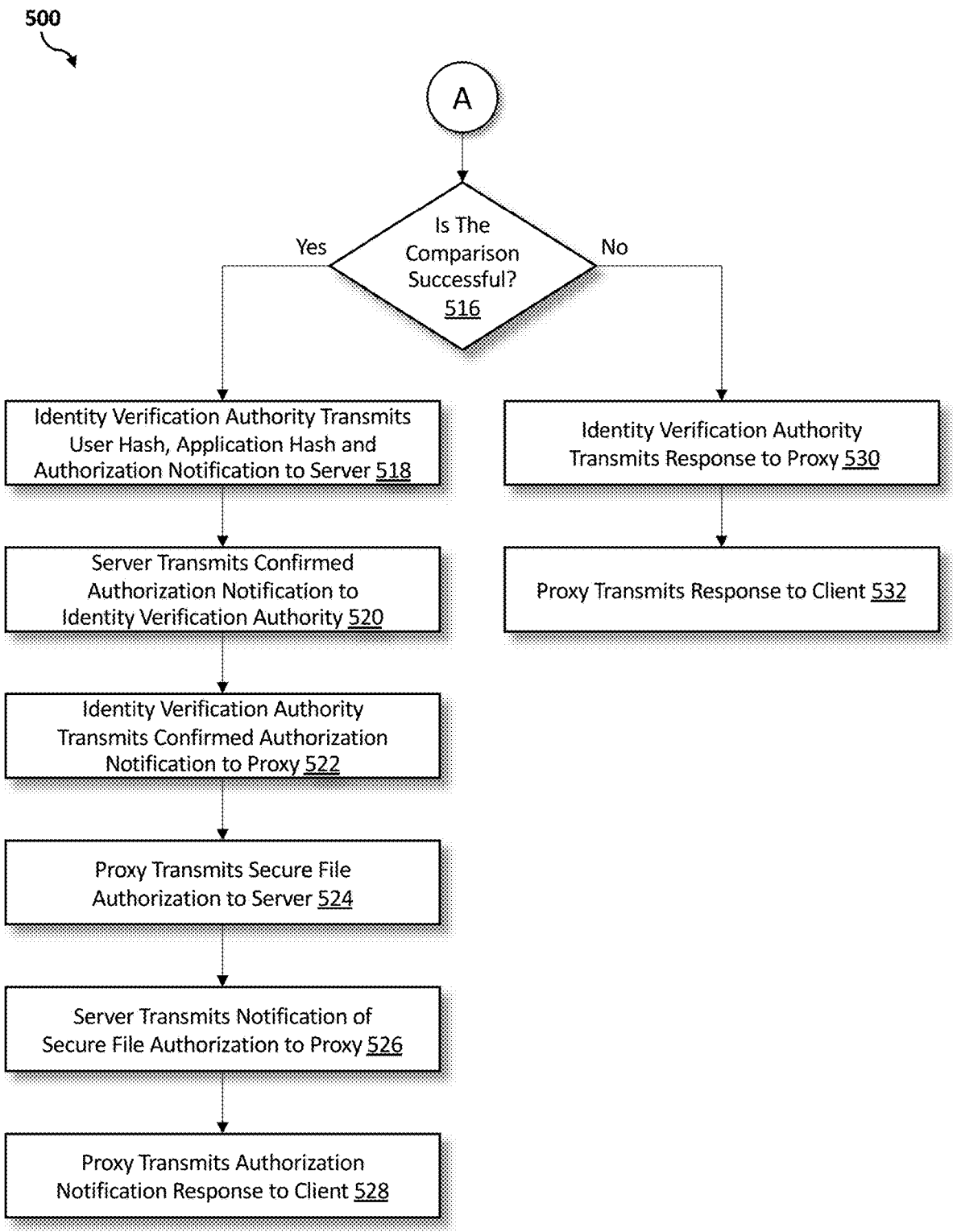

Referring now to FIGS. 5A and 5B, an operational flowchart illustrating the exemplary stateless multi-party authorization and authentication process 500 used by the multi-party authorization program 110a, 110b according to at least one embodiment is depicted. In FIG. 4, an account was created and now an embodiment to authenticate the client 202 is depicted.

At 502, the client 202 transmits authentication data to the proxy 204. The client 202 may send an HTTP request to the proxy 204. The HTTP request may be transmitted with client data, such as a username, a password and the application information for authentication. The client 202 data may be used by the proxy 204 to authenticate access to the application. The password may be the password that was previously created by the client 202 and transmitted to the proxy 204 for authentication and access to the application.

An example of the client 202 HTTP request is as follows:
GET/securefiles/HTTP/1.1
Host: www.hostname.com
Username=<username>&Password=<password>&
Application=<application>.

At 504, the proxy 204 generates a secret 214, a user hash (e.g., userHash 212) and an application hash (e.g., appHash 218) using the authentication data. Upon receiving the HTTP request from the client 202, the proxy 204 has access to the client username, the password and the application information. The proxy generates the secret 214, the userHash 212 and the appHash 218 as in step 404.

At 506, the proxy 204 transmits the user hash (e.g., userHash 212), the application hash (e.g., appHash 218) and the password to the identity verification authority (e.g., IVA 206). The proxy 204 may transmit an HTTP request to the IVA 206 as in step 406.

At 508, the identity verification authority (e.g., IVA 206) generates a password hash (e.g., passHash 222). The IVA 206 receives the HTTP request from the proxy 204. The IVA 206 has access to the userHash 212, the password and the appHash 218 based on the received request. The IVA 206 may not be privy to, know about or have access to the username, the secret or the application information. The IVA 206 may have access to the userHash 212 and the appHash 218 with no ability to decode and access the username and the application information. The IVA 206 may generate a password hash (e.g., SHA, MD5 or cryptographic) using the password data received. The hash of the password may be, for example, passHash 222.

At 510, the identity verification authority (e.g., IVA 206) transmits the user hash (e.g., userHash 212) and the application hash (e.g., appHash 218) to the server 208. The IVA 206 may transmit an HTTP request to the server 208 to get the stored passHash 222 associated with the userHash 212 and appHash 218. For example, the IVA 206 transmits the userHash 212 and appHash 218 to the server 208 as exemplified as follows:
GET/securefiles/HTTP/1.1
Host: www.hostname.com
Authorization: IVS action=GetPassHash
UserHash=<userHash>&AppHash=<appHash>.

At 512, the server 208 identifies the password hash (e.g., passHash 222) associated with the received user hash (e.g., userHash 212), the application hash (e.g., appHash 218). The server 208 may receive an HTTP request from the IVA 206. The server 208 may identify the correct or matching passHash 222 associated with the received userHash 212 and appHash 218 pair. The server 208 may identify and have access to the userHash 212, the appHash 218 and the passHash 222. Although the server 208 may have the ability to decode the userHash 212 and the appHash 218 with the secret 214 to gain access to the username and application information, respectively, the server 208 may not have access to the password. The server 208 may also not have decoding ability to access the password, for example, in a clear text form, from the passHash 222.

At 514, the server 208 transmits the password hash (e.g., passHash 222) and an authorization notification to the identity verification authority (e.g., IVA 206). The server 208 may transmit a response back to the IVA 206 and the response may include the matching passHash 222 that was stored on the server 208 during the stateless multi-party authorization account creation process 400. For example, the server 208 transmits, as a response, the stored passHash 222 back to the IVA 206 as exemplified as follows:
HTTP/1.1 200 OK
PassHash=<passHash>.

At 516, the multi-party authorization program 110a, 110b determines if the comparison is successful. A comparison that is successful may include an exact match of the values for the userHash 212, the passHash 222 and the appHash 218. The IVA 206 may receive the HTTP response from the server containing the passHash 222 that is associated with the userHash 212 and the appHash 218. The identity verification authority (e.g., IVA 206) compares the password hash received by the server 208 for authentication (e.g., passHash 222) with the generated password hash, for example, the password hash generated at step 508, passHash 222.

The passHash 222 values should match exactly even though the values may come from varying entities. For example, at the authentication step, the IVA 206 receives a password from the client 202, computes the passHash 222 and compares the textual match of the passHash 222 against the value received by the IVA 206 from the server 204. The server 204 had previously stored the passHash 222 during the new account creation phase. Therefore, the IVA pas-sHash 222 should perfectly match the server 204 passHash value unless a failure to create, authenticate or match the values has occurred.

If the multi-party authorization program 110a, 110b determines that the comparison is successful at 516, then the identity verification authority (e.g., IVA 206) transmits the user hash (e.g., userHash), the application hash (e.g., appHash) and an authorization notification to the server 208 at 518. For example, the IVA 206 transmits an HTTP request to the server 208 as exemplified as follows:
GET/securefiles/HTTP/1.1
Host: www.hostname.com
UserHash=<userHash>&AppHash=<appHash>&
Authentication=true.

At 520, the server 208 transmits a confirmed authorization notification to the identity verification authority (e.g., IVA 206). For example, the server 208 receives the HTTP request from the IVA 206, generates a session cookie and responds back to the IVA 206 as exemplified as follows:
HTTP/1.1 200 OK
Set-Cookie: <session=1>.

At 522, the identity verification authority (e.g., IVA 206) transmits a confirmed authorization notification to the proxy 204. For example, the IVA 206 receives the HTTP response from the server 208. In response, the IVA 206 may respond back to the proxy 204 with the cookie indicating a successful authentication as exemplified as follows:
HTTP/1.1 200 OK
Set-Cookie: <session=1>.

At 524, the proxy 204 transmits a secure file authorization to the server 208. For example, the proxy 204 receives the HTTP response from the IVA 206. In response, proxy 204 may transmit an HTTP request to the server 208 with the cookie indicating a successful authentication as exemplified as follows:
GET/securefiles/HTTP/1.1
Host: www.hostname.com
Cookie: <session=1>.

At 526, the server 208 transmits a notification of the secure file authorization to the proxy 204. For example, the server 208 receives an HTTP request from the proxy 204 and the server transmits a response back to the proxy 204 as exemplified as follows:
HTTP/1.1 200 OK.

At 528, the proxy 204 transmits an authorization notification response to the client 202. For example, the proxy receives the HTTP response from the server 208 and transmits a response back to the client 202 as exemplified as follows:
HTTP/1.1 200 OK.

The client 202 may be notified of the successful authentication by, for example, an alert on a computing device or a smart phone with a message of conformation that the authentication process was successful or by allowing the client successful access to the application. The successful authentication message may, for example, contain HTML content or JavaScript® (JavaScript and all JavaScript-based trademarks and logos are trademarks or registered trademarks of Oracle Corporation and/or its affiliates) content to execute the client's desired behavior, such as opening an email application, a social media application or to gain access to another secure account, such as a banking account.

If the multi-party authorization program 110a, 110b determines that the comparison is not successful at 516, then the identity verification authority (e.g., IVA 206) transmits a response to the proxy 204 at 530. For example, the IVA 206 transmits an HTTP response to the proxy 204 as exemplified as follows:

HTTP/1.1 401 Unauthorized
WWW-Authenticate: IVS.

At 532, the proxy 204 transmits a response to the client 202. The proxy 204 may receive the HTTP response from the IVA 206 and then transmit an HTTP response back to the client 202 as exemplified as follows:

HTTP/1.1 401 Unauthorized
WWW-Authenticate: IVS.

The client 202 may be notified of the unsuccessful authentication by, for example, an alert on a computing device or a smart phone with a message that the authentication process has failed, and access has been denied.

It may be appreciated that FIGS. 2-5 provide only an illustration of one embodiment and do not imply any limitations with regard to how different embodiments may be implemented. Many modifications to the depicted embodiment(s) may be made based on design and implementation requirements.

Figure 6:
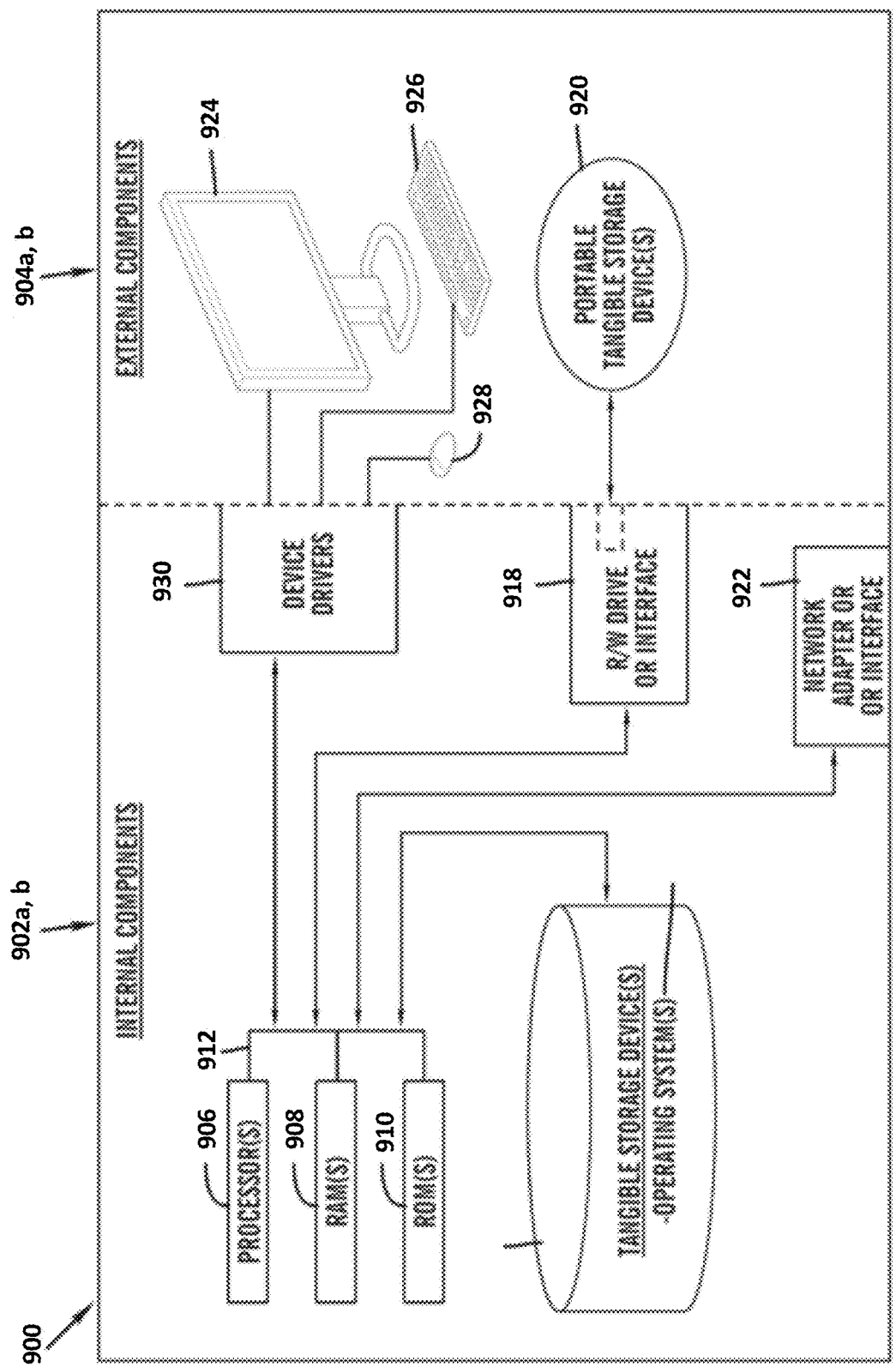
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the multi-party authorization program 110a in client computer 102, and the multi-party authorization program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the multi-party authorization program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the multi-party authorization program 110a in client computer 102 and the multi-party authorization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the multi-party authorization program 110a in client computer 102 and the multi-party authorization program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
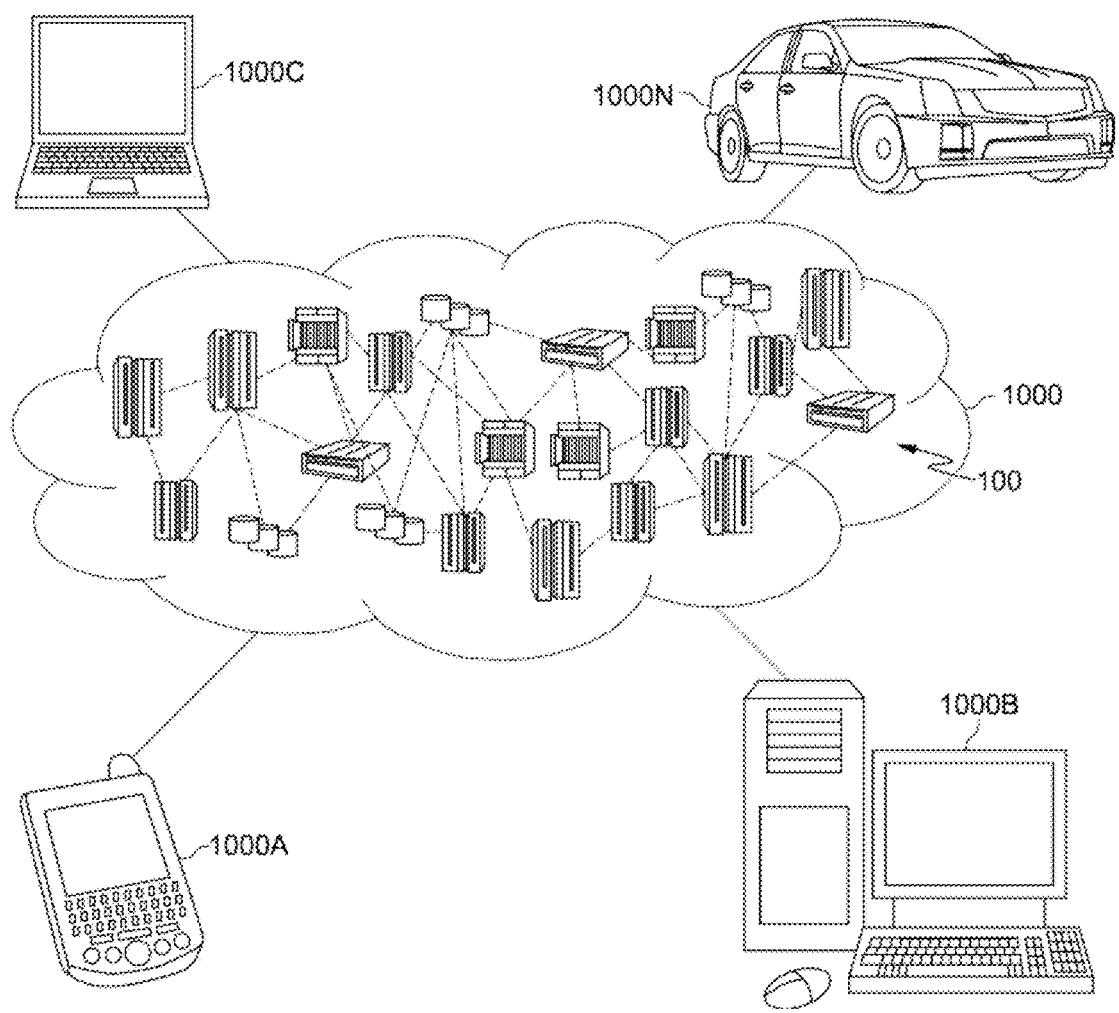
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
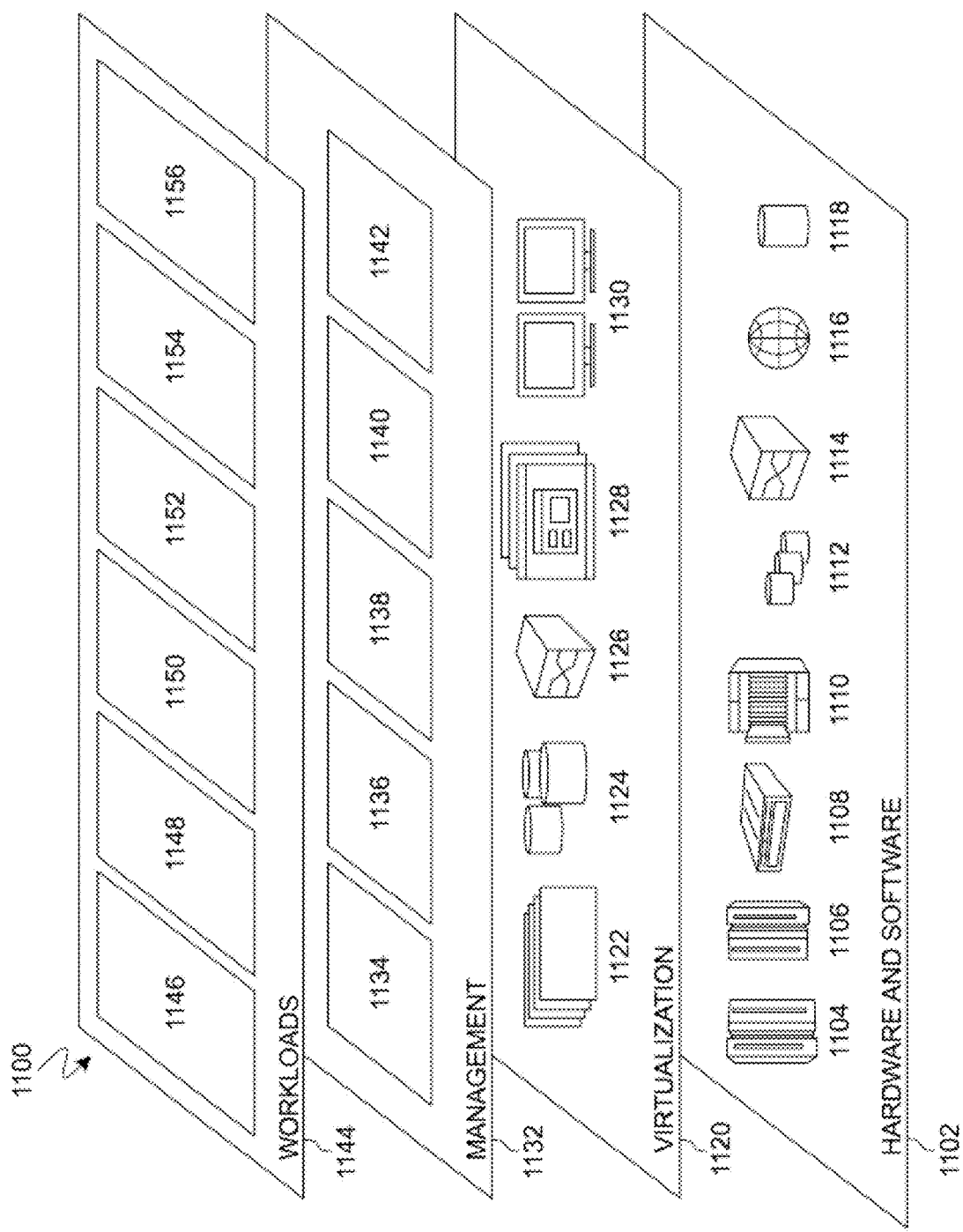
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and stateless multi-party authorization 1156. A multi-party authorization program 110a, 110b provides a way to securely transfer client data when creating a secret, when creating a new account and when authenticating a client to use an application in a cloud environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for authorization using multiple entities, the method comprising:
    generating, by a proxy, a secret, a user hash and an application hash based on receiving client data, wherein the client data includes a username, a password and application data;
    transmitting, by the proxy, the user hash, the application hash and the password to an identity verification authority;
    generating, by the identity verification authority, a password hash;
    transmitting, by the identity verification authority, the user hash and the application hash to a server;
    identifying, by the server, the generated password hash that is associated with the user hash and the application hash;
    transmitting, by the server, the identified password hash and an authorization notification to the identity verification authority;
    comparing, by the identity verification authority, the transmitted password hash with a previously stored password hash; and
    determining that the comparison of the transmitted password hash matches the previously stored password hash.

2. The method of claim 1, further comprising:
    storing, by the server, the user hash, the application hash and the generated password hash.

3. The method of claim 1, further comprising:
    decoding, by the server, the user hash and the application hash; and
    storing, by the server, the decoded user hash, the decoded application hash and the generated password hash.

4. The method of claim 1, wherein the proxy has access to the username, the password and the application data.

5. The method of claim 1, wherein the identity verification authority has access to the user hash, the application hash and the password.

6. The method of claim 1, wherein the server has access to the user hash, the application hash and the generated password hash, wherein the server has the ability to decode the user hash and the application hash, wherein the server does not have the ability to decode the generated password hash.

7. The method of claim 1, wherein the secret includes a salt file.

8. A computer system for authorization using multiple entities, comprising:
    one or more processors;
    one or more computer-readable memories;
    one or more computer-readable tangible storage media; and
    program instructions stored on at least one of the one or more computer-readable tangible storage media for execution by at least one of the one or more processors via at least one of the one or more computer-readable memories, wherein the computer system is capable of performing a method comprising:
        generating, by a proxy, a secret, a user hash and an application hash based on receiving client data, wherein the client data includes a username, a password and application data;
        transmitting, by the proxy, the user hash, the application hash and the password to an identity verification authority;
        generating, by the identity verification authority, a password hash;
        transmitting, by the identity verification authority, the user hash and the application hash to a server;
        identifying, by the server, the generated password hash that is associated with the user hash and the application hash;
        transmitting, by the server, the identified password hash and an authorization notification to the identity verification authority;
        comparing, by the identity verification authority, the transmitted password hash with a previously stored password hash; and
        determining that the comparison of the transmitted password hash matches the previously stored password hash.

9. The computer system of claim 8, further comprising:
    storing, by the server, the user hash, the application hash and the generated password hash.

10. The computer system of claim 8, further comprising:
    decoding, by the server, the user hash and the application hash; and
    storing, by the server, the decoded user hash, the decoded application hash and the generated password hash.

11. The computer system of claim 8, wherein the proxy has access to the username, the password and the application data.

12. The computer system of claim 8, wherein the identity verification authority has access to the user hash, the application hash and the password.

13. The computer system of claim 8, wherein the server has access to the user hash, the application hash and the generated password hash, wherein the server has the ability to decode the user hash and the application hash, wherein the server does not have the ability to decode the generated password hash.

14. The computer system of claim 8, wherein the secret includes a salt file.

15. A computer program product for authorization using multiple entities, comprising:
   one or more computer-readable tangible storage media and program instructions stored on at least one of the one or more computer-readable tangible storage media, the program instructions executable by a processor to cause the processor to perform a method comprising:
      generating, by a proxy, a secret, a user hash and an application hash based on receiving client data, wherein the client data includes a username, a password and application data;
      transmitting, by the proxy, the user hash, the application hash and the password to an identity verification authority;
      generating, by the identity verification authority, a password hash;
      transmitting, by the identity verification authority, the user hash and the application hash to a server;
      identifying, by the server, the generated password hash that is associated with the user hash and the application hash;
      transmitting, by the server, the identified password hash and an authorization notification to the identity verification authority;
      comparing, by the identity verification authority, the transmitted password hash with a previously stored password hash; and
      determining that the comparison of the transmitted password hash matches the previously stored password hash.

16. The computer program product of claim 15, further comprising:
   storing, by the server, the user hash, the application hash and the generated password hash.

17. The computer program product of claim 15, further comprising:
   decoding, by the server, the user hash and the application hash; and
   storing, by the server, the decoded user hash, the decoded application hash and the generated password hash.

18. The computer program product of claim 15, wherein the proxy has access to the username, the password and the application data.

19. The computer program product of claim 15, wherein the identity verification authority has access to the user hash, the application hash and the password.

20. The computer program product of claim 15, wherein the server has access to the user hash, the application hash and the generated password hash, wherein the server has the ability to decode the user hash and the application hash, wherein the server does not have the ability to decode the generated password hash.

* * * * *